(12) United States Patent
Pierre et al.

(10) Patent No.: US 7,902,777 B2
(45) Date of Patent: Mar. 8, 2011

(54) METHOD AND SYSTEM FOR MOTOR OSCILLATORY STATE DETECTION

(75) Inventors: Jerome Pierre, Frittlingen (DE); Nigel Strike, Phoenix, AZ (US); Eric A. Hardt, Tempe, AZ (US)

(73) Assignee: Minebea Co., Ltd. (JP)

( * ) Notice: Subject to any disclaimer, the term of this patent is extended or adjusted under 35 U.S.C. 154(b) by 363 days.

(21) Appl. No.: 12/061,526

(22) Filed: Apr. 2, 2008

(65) Prior Publication Data

US 2009/0251085 A1 Oct. 8, 2009

(51) Int. Cl.
*H02H 7/08* (2006.01)

(52) U.S. Cl. .......... 318/400.21; 318/400.01; 318/400.24; 318/400.25; 318/700

(58) Field of Classification Search ............. 318/400.21, 318/400.24, 400.25, 400.01, 700
See application file for complete search history.

(56) References Cited

U.S. PATENT DOCUMENTS

| | | | | |
|---|---|---|---|---|
| 5,574,608 A | * | 11/1996 | Fukuoka | 361/23 |
| 5,901,268 A | * | 5/1999 | Ando et al. | 388/811 |
| 6,011,368 A | * | 1/2000 | Kalpathi et al. | 318/434 |
| 7,002,311 B2 | * | 2/2006 | Strike et al. | 318/400.13 |
| 7,042,180 B2 | * | 5/2006 | Terry et al. | 318/400.21 |

* cited by examiner

*Primary Examiner* — Walter Benson
*Assistant Examiner* — David S Luo
(74) *Attorney, Agent, or Firm* — Kilpatrick, Townsend & Stockton LLP (57) ABSTRACT

Method and system for motor oscillatory state detection. According to various embodiments, the present invention presents a method for determining whether a motor is in an oscillatory state. The method includes powering up a motor for a period of time and then monitoring the movement of the motor during a period after the power if turned off. Based on the movement of the motor and/or impeller during a time period after the power is turned off, whether the motor is in an oscillatory state is determined. The method also includes initiating a process for handle error if the motor is in the oscillation state.

19 Claims, 9 Drawing Sheets

METHOD AND SYSTEM FOR MOTOR OSCILLATORY STATE DETECTION

BACKGROUND OF THE INVENTION

The present invention relates generally to electric motor systems. More specifically, various embodiments of the present invention are directed to monitoring, determination, and control of improper rotor operation, which include, but not limited to, oscillatory state and/or locked state of rotors. Among others, embodiments of the present invention reduce and/or eliminate undesirable effects of motor oscillation states.

Electric motor systems have been widely used since Michael Faraday demonstrated the principle of conversion of electrical energy into mechanical energy in 1821. Today, from car engines to computer components, electric motor systems have a wide range of applications.

Many electronic devices that require efficiency, performance, or control use brushless DC motors. These electronic devices include computer fans, optical drives, etc.

Brushless DC motors generally comprise three major stages: a control stage, a pre-driver stage, an actual driver stage. A typical actual driver stage can be bipolar or unipolar. In some applications, there are multiple-pole brushless motors that use a polyphase driver stage. A bipolar driver stage comprises four switching devices, e.g., field effect transistors (FETs) or bipolar junction transistors (BJTs), arranged in a full-bridge configuration. The switching devices are driven by complementary pulses generated by the pre-driver stage such that the switching devices that are located diagonally with respect to one another are turned on at the same time. A unipolar driver stage consists of two switching devices arranged in a half-bridge configuration, only one of which is turned on at one time.

The pre-driver stage consists of a discrete integrated circuit (IC) that generates the complementary pulses for the driver stage in response to the output from a Hall sensor. For example, in a fan, the Hall sensor is switched by the permanent magnet component of a rotor of a motor. When one magnetic pole of the permanent magnet comes near the Hall device as the rotor rotates, the output of the Hall sensor switches from one logic state (e.g., a logic low or a logic high) to the complementary logic state. The output of the hall sensor switches back when the opposite polarity is sensed by the Hall sensor. The switching of the Hall sensor provides angular position information of the rotor. Usually, the angular position from the Hall sensor is sent to and used by the control IC.

Figure 1:
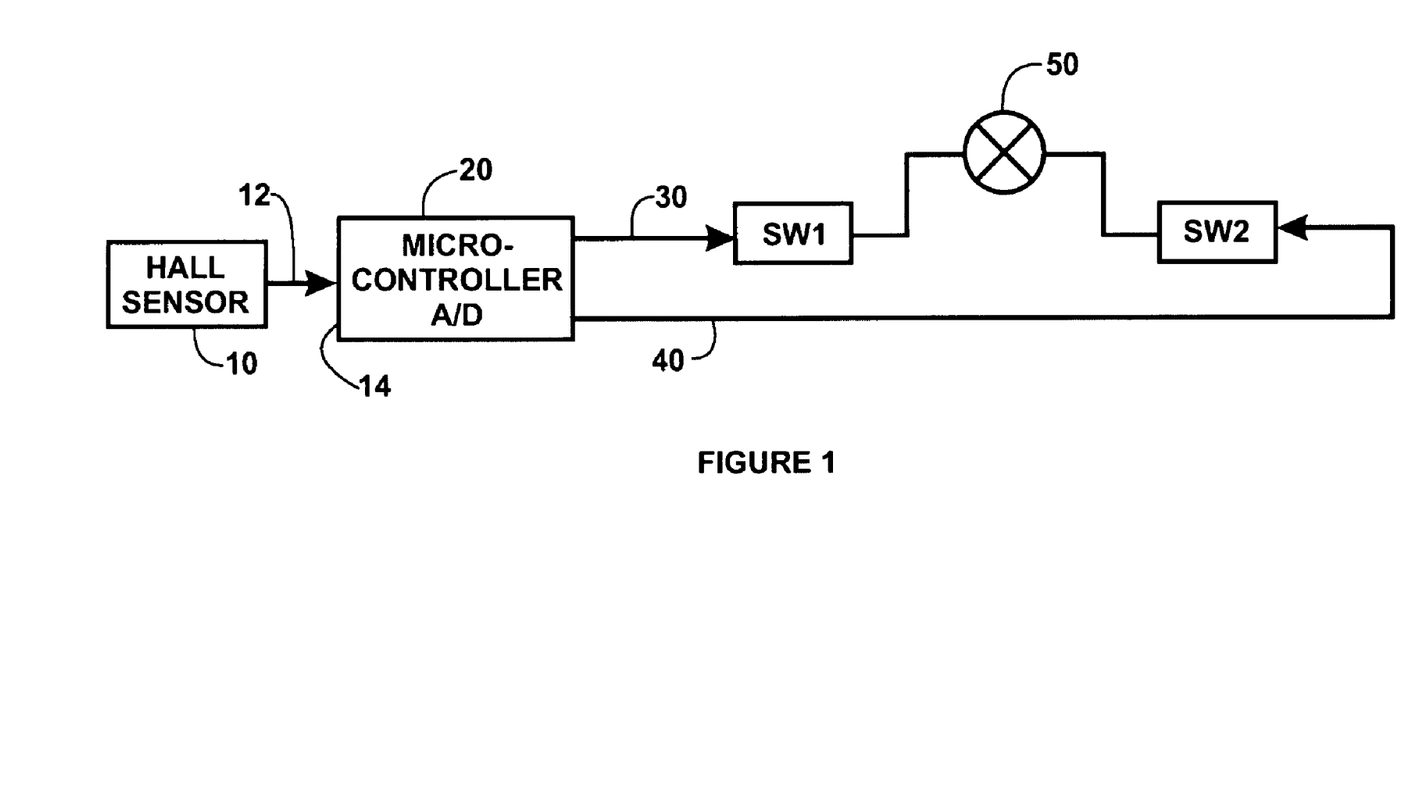
FIGS. 1 and 2 show a simplified block diagram and a schematic diagram respectively of a brushless DC motor.
Figure 2:
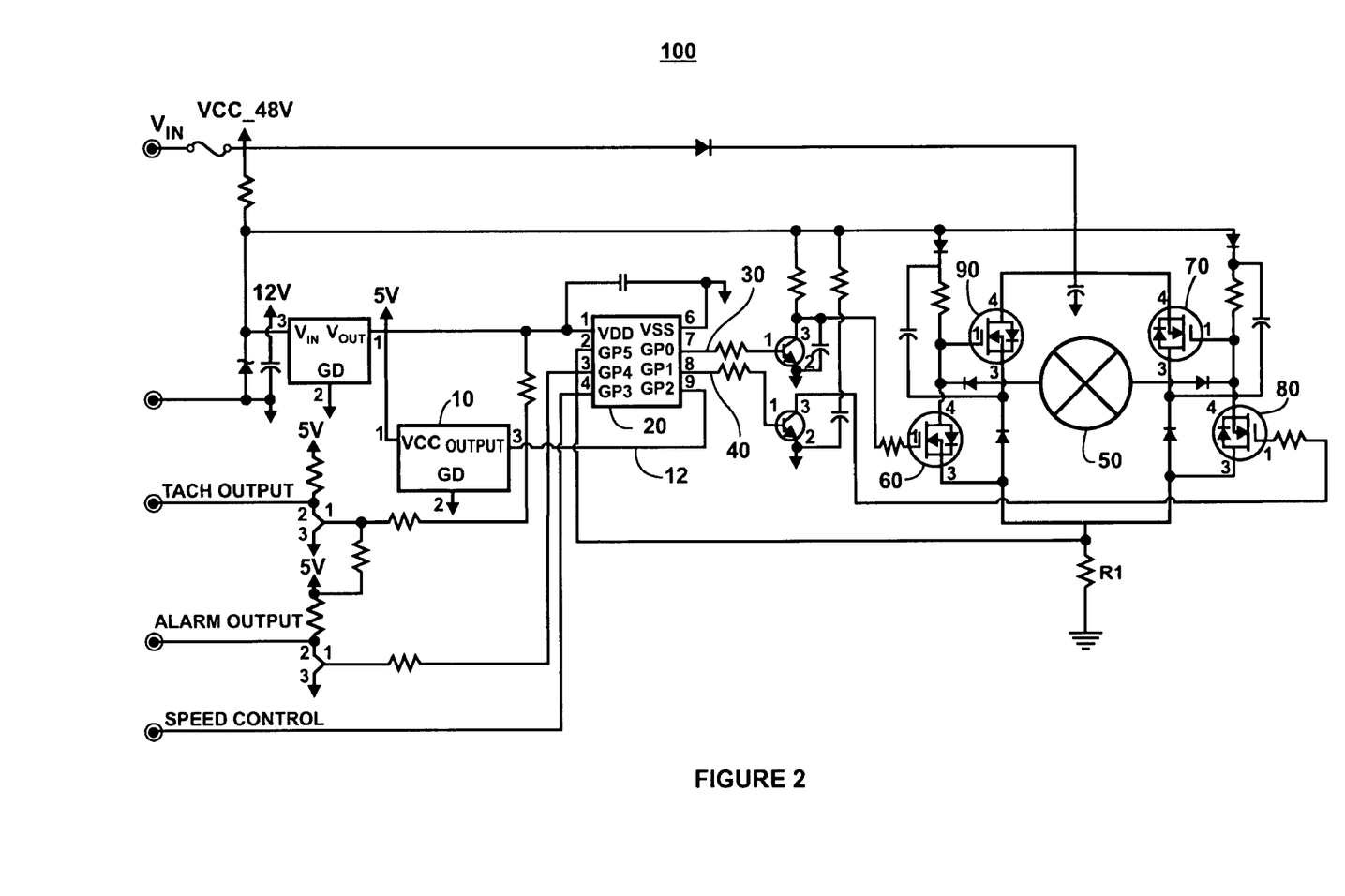

FIGS. 1 and 2 show a simplified block diagram and a schematic diagram respectively of a brushless DC motor system. Detailed descriptions on the operation of microcontroller-operated DC motor are provided U.S. Pat. No. 6,611,117, titled "DC Circuit for a Brushless DC Motor", commonly owned by the assignee the present invention and incorporated herein in its entirety for all purposes. The motor 100 includes a Hall sensor 10 having an output 12; a microcontroller 20 having complementary outputs 30 and 40; stator coil 50; and switches SW1 and SW2. In the block diagram shown in FIG. 1, the switches SW1 and SW2 comprise the two switches that are on at the same time in a full-bridge driver stage. In the schematic diagram shown in FIG. 2, the switches SW1 and SW2 of FIG. 1 are represented by switches 60 and 70 or switches 80 and 90. An example of Hall sensor 10 is a part commonly known in the industry by part number UA3175 and likewise an example of the microcontroller 20 is a part known in the industry by part number PIC12C671.

One application for the brushless DC motor shown in FIGS. 1 and 2 is in a fan of the type used for cooling electronic circuits. Such a brushless DC fan, which is to say a fan driven by a brushless DC motor, further includes an impeller coupled to the motor and mounted in an impeller housing (not shown). The impeller of the fan is caused to rotate when current flows through the switch SW1, the stator coil 50, and the switch SW2. The direction of impeller rotation, i.e., clockwise or counter-clockwise, is determined by the direction of current flow through the switch SW1, the stator coil 50, and the switch SW2.

In an exemplary implementation of Hall sensor, the impeller housing contains a permanent magnet which produces a magnetic field for the brushless DC fan. The Hall sensor 10 detects a change in the state of the magnetic field that is produced as the impeller of the brushless DC fan rotates in relation to the permanent magnet. As the impeller reaches a rotational extreme in either the clockwise or the counter-clockwise direction, the Hall sensor 10 detects the change in the state of the magnetic field of the brushless DC fan, and the output 12 of the Hall sensor changes its logic state.

The output 12 of the Hall sensor 10 is provided to the microcontroller 20, and the state of the outputs 30 and 40 of the microcontroller 20 is a function of the output 12 of the Hall sensor 10. Thus, according to an embodiment of the present invention, whenever the microcontroller 20 senses a change in the output 12 of the Hall sensor 10, the microcontroller 20 changes its outputs 30 and 40 in a complementary manner. For example, if the output 12 of the Hall sensor 10 is a logic high, the microcontroller 20 causes the output 30 to transition from a logic low to a logic high and simultaneously causes the output 40 to transition from a logic high to a logic low. It will be appreciated by those having skill in the art that the particular relationship between the state of the outputs 30 and 40 of the microcontroller 20 and the output 12 of the Hall sensor 10 can be varied to conform to the requirements of a particular brushless DC motor or fan.

The brushless DC motor described in FIGS. 1 and 2 is more reliable and efficient than older motors due to the presence of a microcontroller. Among other features, the DC motor in FIGS. 1 and 2 provides mechanisms through the microcontroller (and the advanced control algorithm therein) and the Hall effect sensor to prevent the motor from damaging itself from a condition known as the "locked rotor" condition.

A "locked rotor" condition can arise when a motor is "locked" for various reasons, such as undesirable physical interference, unbalanced driving energy, etc. For example, a DC motor that is used for rotating a fan may be locked into a position when the fan is blocked. The closed loop from the output of the driver stage to the pre-driver stage enables the fan to run essentially self-sufficiently. However, there are some conditions where the fan requires assistance to operate correctly and, very importantly, safely. For example, in a "locked rotor" condition, where the fan impeller is stopped for any reason, the fan has to turn itself off in order not to burn out the switching devices in the driver stage. After a predetermined time period of t seconds the fan must determine whether the fan impeller is free to resume rotating. The fan does this by turning on one output of the pre-driver stage and waiting for the impeller to turn. If the impeller does not begin to turn within a predetermined time period, the output of the pre-driver is turned off again. The fan repeats this cycle every t seconds. The timing for the restart cycles is provided by a resistor-capacitor network that is external of the pre-driver IC.

The "locked rotor" situation is not the only pitfall that can potentially cause motors to malfunction. Another problem that can potentially lead to motor malfunction is the oscillatory state problem. In an oscillator state, which is sometimes referred to as oscillatory or "rocking" state, an electric motor lock itself in an angular position in which positive and negative torque is produced, provoking an oscillatory mode that can be described as "rocking". Typically, a motor goes into an oscillatory state when the rotor is not rigidly held. For example, the motor may be loosely stuck due to a foreign object that is impeding the free wheeling of the motor. If the motor is in this oscillatory mode, it may never get out of it. If the driving module tries to overcome by increasing the driving energy, the increasing current going through the coil and switching devices of the motor can cause the switching devices to burn out.

In the past, various types of conventional techniques have been proposed to address this problem. In some conventional systems, a sensor is provided to monitor movement of the rotor, which may be angular frequency and/or edges from a Hall sensor, when a motor is powered. The conventional system determines whether the rotor is in an oscillatory state based on its movements. Unfortunately, conventional techniques such as the one described above are often inadequate.

BRIEF SUMMARY OF THE INVENTION

The present invention relates generally to electric motor systems. More specifically, various embodiments of the present invention are directed to monitoring, determination, and control of oscillation of rotors. Among others, embodiments of the present invention reduce and/or eliminate undesirable effects of motor oscillate states.

According to various embodiments, the present invention provides a method for determining whether a motor is in an oscillatory state. The method includes powering up a motor for a period of time and then monitoring the movement of the motor during a period after the power if turned off. Based on the movement of the motor during a time period after the power is turned off, whether the motor is in an oscillatory state is determined. For example, based on this determination, the method may initiate a process for error handling if the rotor is in the oscillation state.

According to an embodiment, the present invention provides a method for controlling an electric motor. The method includes providing power to the electric motor for a first time period, the power being used to cause a rotor of the electric motor to rotate. The method further includes monitoring a signal for a second time period, the signal being associated with movements of the rotor, the second time period having a later starting time than the first time period, the electric motor receiving no power during the second time period. The method also includes determining whether the rotor is in an oscillation state based on the signal, the rotor being in the oscillation state if the signal is less than a predetermined threshold level for the second time period. The method also includes initiating a process for error handling if the rotor is in the oscillation state.

According to another embodiment, the present invention provides an electric motor system. The system includes a rotor. The system also includes a driving module, the driving module being adapted to provider power in response to a first control signal, the power being used to cause the rotor to rotate, the driving module further being adapted to stop providing power in response to a second control signal. The system further includes a sensor module, the sensor being configured to monitoring a signal for a predetermined period of time, the signal being associated with movements of the rotor, the rotor receiving no power from the driving module during the predetermined period of time. Moreover, the system includes a control module, the control module being adapted to determining whether the rotor is in an oscillation state based on the signal during the predetermined period of time, the rotor being in the oscillation state if the signal is less than a predetermined threshold level for the second time period. The system initiates a process for error handling if the rotor is in the oscillation state According to yet another embodiment, the present invention provides a method for controlling an electric motor. The method includes providing power to the electric motor for a first time period, the power being used to cause a rotor of the electric motor to rotate. The method further includes monitoring a signal for a second time period, the signal being associated with movements of the rotor, the second time period having a later starting time than the first time period, the electric motor receiving no power during the second time period. The method further includes determining whether the rotor is in an oscillation state based on the signal, the rotor being in the oscillation state if the signal is less than a predetermined threshold level for the second time period. If the rotor is in an oscillatory state, the method further includes generating a signal indicating the oscillatory state, stopping providing power to the rotor for a third time period, and monitoring the signal for a forth time period.

It is to be appreciated that various embodiments of the present invention provide numerous advantages over conventional systems. Among other things, embodiments of the present are capable of detecting oscillatory and/or locked state motor in various situations. For example, by monitoring the movement of a rotor during a period of time after it is powered off allows systems according to the present invention to ascertain whether the rotor is "free-wheeling" and not in an oscillatory state. In contrast, conventional systems often misinterpret the oscillatory movements of rotor as valid rotor movement and thereby fail to detect the oscillatory state. In addition, embodiments of the present invention are less costly than conventional systems to implement, as conventional rotor sensors and driving circuitry may be modified to perform techniques described according to the present invention, whereas conventional systems typically require additional hardware module to analyze rotor movement. There are other benefits as well.

Various additional objects, features and advantages of the present invention can be more fully appreciated with reference to the detailed description and accompanying drawings that follow.

DETAILED DESCRIPTION OF THE INVENTION

The present invention relates generally to electric motor systems. More specifically, various embodiments of the present invention are directed to monitoring, determination, and control of improper rotor operation. Among others, embodiments of the present invention reduce and/or eliminate undesirable effects of motor oscillatory states.

There are various conventional techniques that are directed to detection and prevention of the "rocking motor" situation. For example, a conventional system uses a sensor to monitor movement of the rotor, which may be angular frequency and/or edges from a Hall sensor, when a motor is powered. The conventional system determines whether the rotor is in an oscillatory state based on its movements. For example, the accuracy and reliability of the conventional system are frequency dependent. For example, the main purpose of the Hall sensor is not to detect rocking motor condition. Usually, the sensor is a required component in brushless dc motors to provide rotor position for the purpose of determining rotor speed (e.g., revolutions per second). The sensor output happens to be also used, in certain situations, to detect improper rotor operation, such as rocking and/or locking state.

This type of conventional systems is capable of detecting certain oscillatory state conditions in the rotor, but there are also various shortcomings. In addition to misinterpretation of rotor movement, this type of system is complex and costly to implement. More specifically, this type of conventional system typically requires complex algorithm, which may require additional hardware modules, to monitor and analyze motor movement, often in real time. In contrast, various embodiments of the present invention can be implemented in conjunction with existing systems, such as the conventional system shown in FIG. 1. For example, embodiments of the present invention may be a software algorithm that is adopted by the motor control system.

In contrast to conventional system, embodiments of the present invention determine whether a rotor is in an oscillatory state by first stop supplying power to the rotor and then monitor and analyze motor movement while the rotor is powered off. The principle of operation is illustrated in detail below.

An oscillation condition can be caused by the impeller being obstructed so that it cannot make a complete rotation at start up. This condition sometimes comes up when impeller starts from an angular position in which the rotor position sensor (hall device) is in transition. In either scenario, the fan may run in reverse for a short time before resuming normal rotation however if this cycle repeats the fan is said to be oscillation state. As an example, oscillation state may also be referred to as "rocking" or "wiggling". Usually, the phoneme of "rocking rotor" is the result of the negative torque produced in certain motor and/or drive designs and start conditions as described above. If a fan is susceptible to rocking rotor the drive can be designed to prevent motor damage and free the fan by detecting the fault and cycling motor power until it is removed.

Figure 2A:
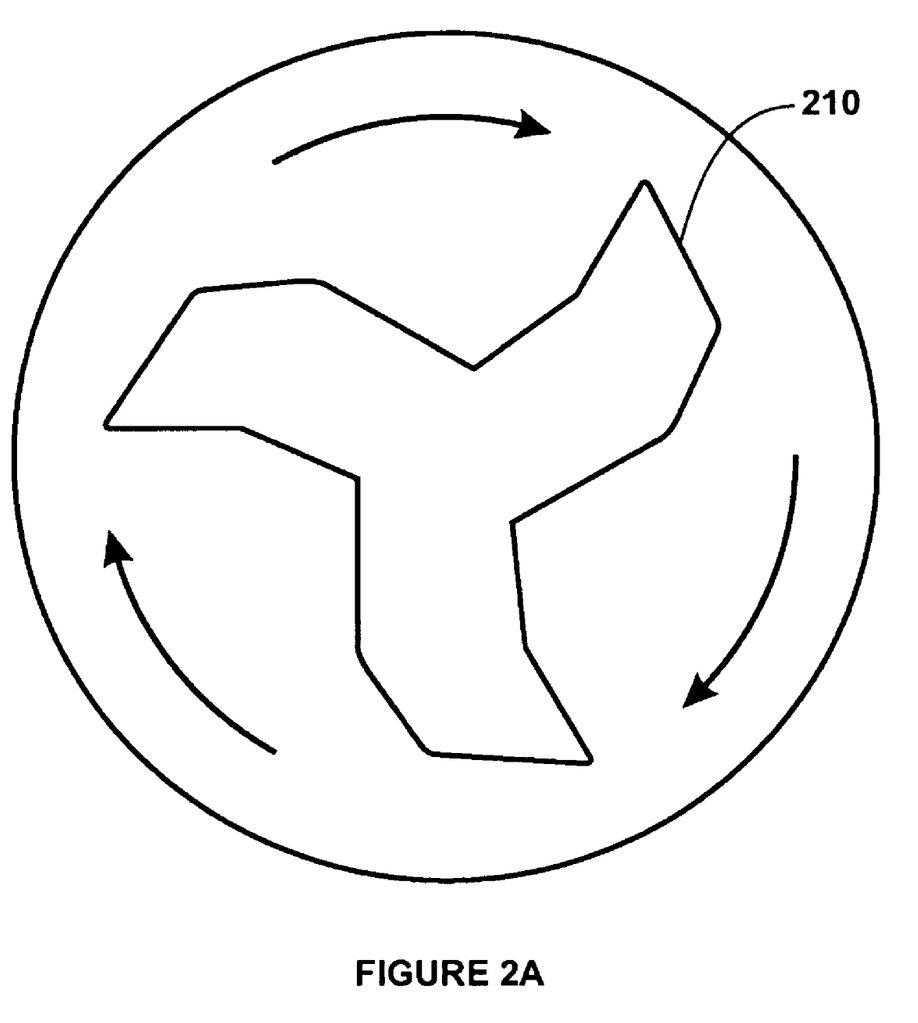
FIGS. 2A and 2B are simplified diagrams illustrating the oscillator state of motor.
Figure 2B:
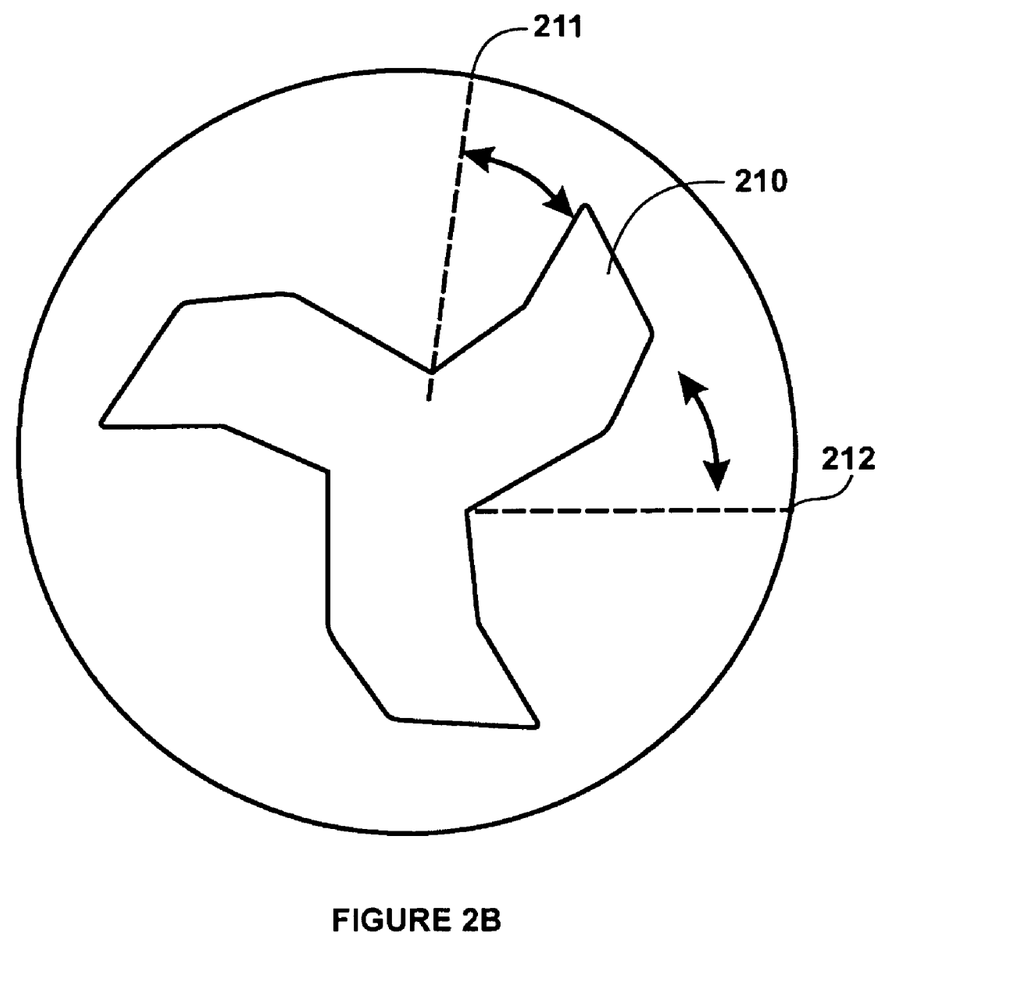

FIGS. 2A and 2B are simplified diagrams illustrating the oscillator state of motor. A normal rotor operation is shown in FIG. 2A, where the rotor 210 makes full clockwise rotations. FIG. 2B illustrates rotor operation in the oscillatory state, where the rotor 210 "rocks" back and forth between position 211 and position 212.

Figure 3:
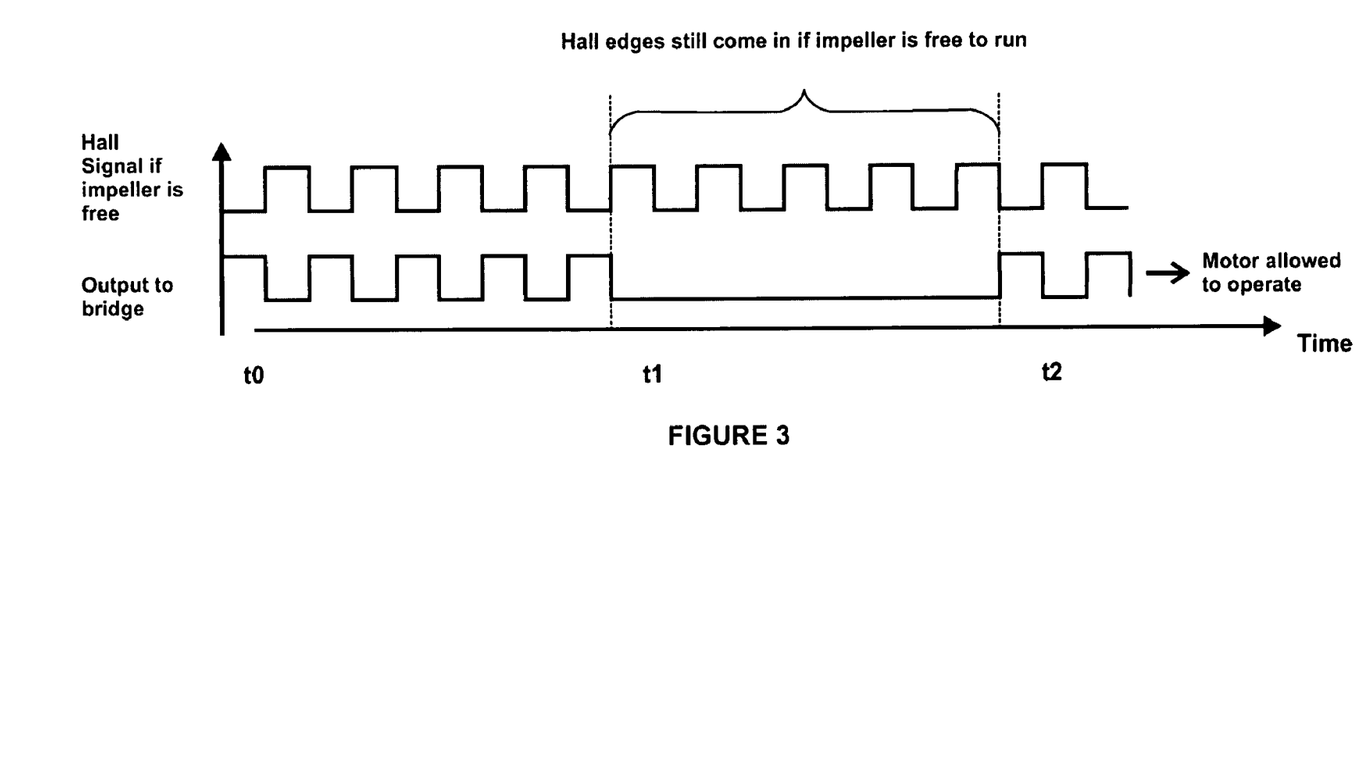
FIGS. 3-5 are simplified timing diagrams illustrating a process for determining whether a rotor is in an oscillatory state according to an embodiment of the present invention.
Figure 4:
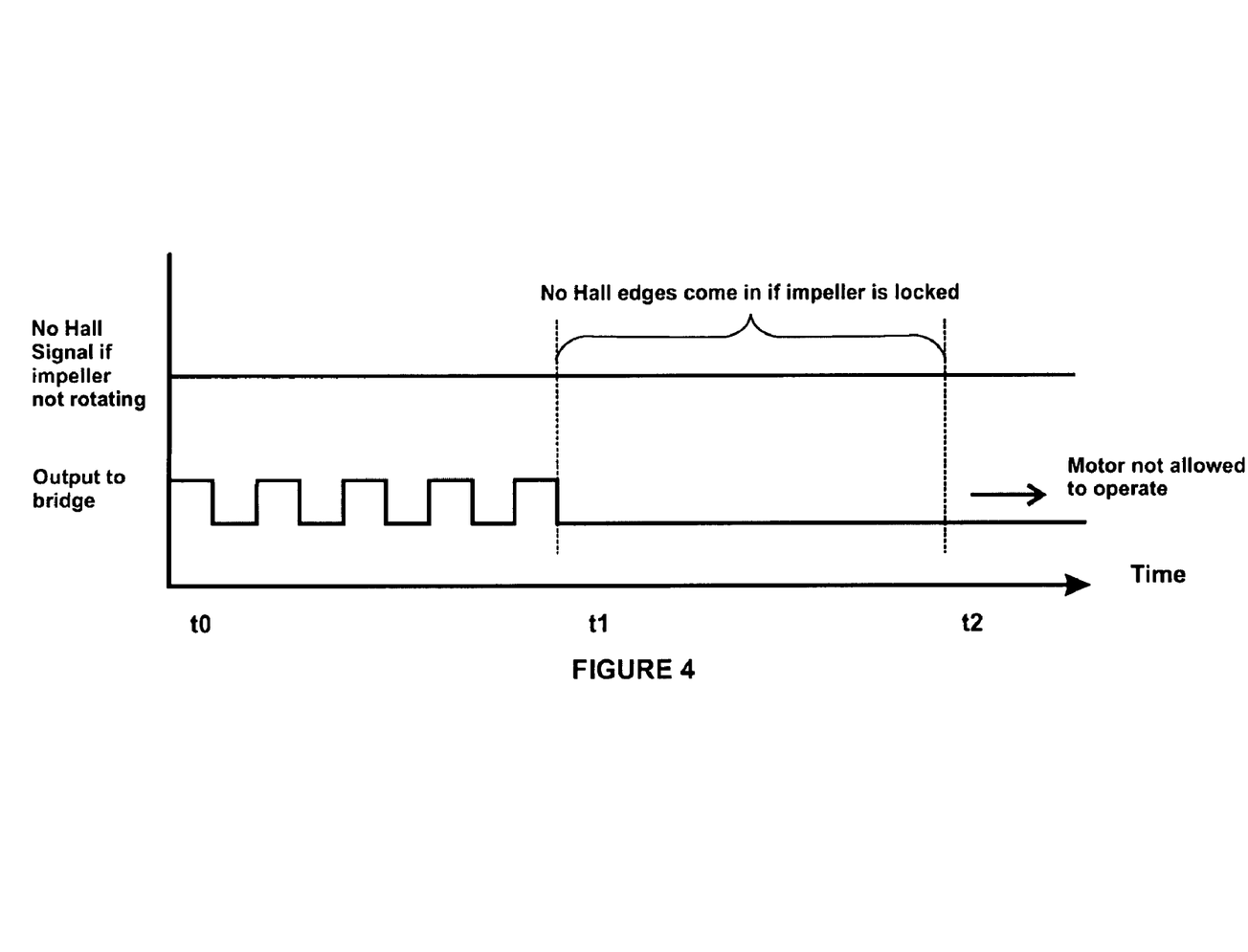
Figure 5:
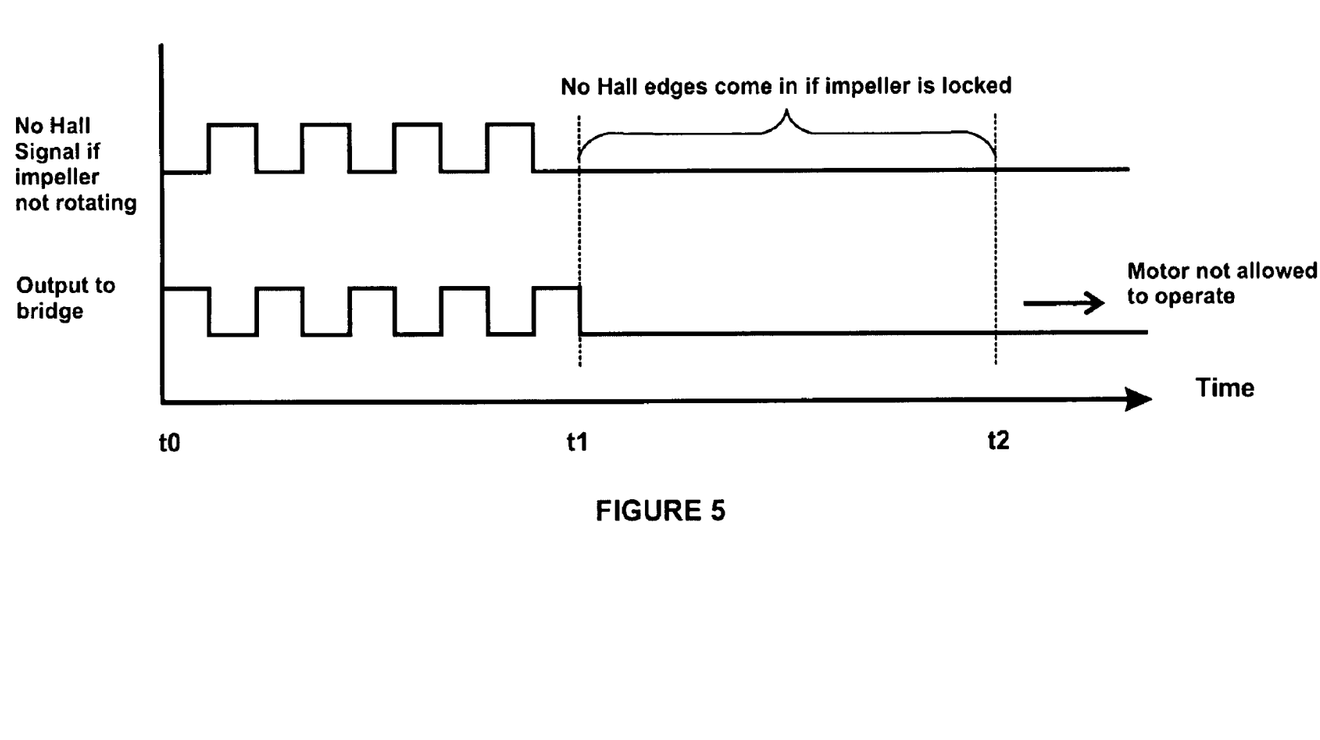

FIGS. 3-5 are simplified timing diagrams illustrating the process for determining whether a rotor is in an oscillatory state according to an embodiment of the present invention. These diagrams are merely examples, which should not unduly limit the scope of the claims. One of ordinary skill in the art would recognize many variations, alternatives, and modifications.

As shown in FIG. 3, the top waveform shows the Hall signal, which is based on the movement of the rotor as explained above. In alternative embodiments, other types of signals may be used to indicate rotor movements. For example, an optical sensor may be used to monitor rotor movements, in which case movement is manifested as an optical signal. The bottom waveform shows the commutation signal that is used to energize the coil(s) of the rotor. For example, the commutation signal is provided by a power driver circuit to a power bridge. In a specific embodiment, the power driver circuit is illustrated in FIG. 2. But it is understood the power driver circuit may be implemented using other designs.

During the time period between t0 and t1, the presence of rising and falling edges of Hall signal indicate rotor motion. The Hall sensor merely senses the passing of the rotor's permanent magnets, but not the direction of travel. Thus, as explained above in connection with a rocked rotor condition, the back and forth motion of the rocking rotor could produce an output signal that appears similar to the output signal for a free-wheeling rotor. Therefore, by looking at the Hall signal during the time between t0 and t1, it can be determined whether the impeller is free.

During the time period between t0 and t1, the presence of rising and falling edges of Hall signal indicate rotor motion. The Hall sensor merely senses the passing of the rotor's permanent magnets, but not the direction of travel. Thus, as explained above in connection with a rocked rotor condition, the back and forth motion of the rocking rotor could produce an output signal that appears similar to the output signal for a free-wheeling rotor. Therefore, by looking at the Hall signal during the time between t0 and t1, During the time period between t1 and t2, the power is switched off, i.e., the commutation signal is removed. Again, the duration of the time period between t1 and t2 can be adjusted and is typically on the order of a few seconds to less than a minute. During this time period, the rotor would continue to rotate on its own due to momentum, unless there is certain blockage, hindrance, or the rotor is in an oscillatory state that causes the rotor to stop moving. In the situation illustrated in FIG. 3, there are Hall signals indicating rotor movements when the rotor receives no power. Thus it is determined that the rotor is not in an oscillatory state. For example, the free movement of the rotor when no commutation signal is supplied to the coils is sometimes referred to as a free-wheeling state.

After the time t2, power is supplied to the rotor, which causes the rotor to rotate. The power is supplied because it is determined that the rotor functions properly and is not in the oscillatory state.

In FIG. 4, there are also two waveforms, but illustrating a different situation. The top waveform shows the Hall signal, which is based on the movement of the rotor as explained above. In alternative embodiments, other types of signals may be used to indicate rotor movements. The bottom waveform shows commutation signal that is used to cause the rotor to move.

The process of monitoring a rotor is divided into three time periods. During the time period between t0 and t1, the commutation signal is supplied to the rotor, which under normal conditions would cause the rotor to move, but in the scenario of FIG. 4, the rotor does not move. In a specific embodiment, the time period between t0 and t1 is the time that is used to start up the rotor. For example, the time period is predetermined, which could be a few seconds. Depending on the specific application, the amount of the time between t0 and t1 may be adjusted.

During the time period between t0 and t1, the flat Hall signal indicates that there is no rotation when the commutation signal is applied. In other words, during the time period between t0 and t1, the rotor does not rotate even though the commutation signal is being supplied. For example, the zero detected movement from the rotor means that the rotor is probably blocked by some foreign object. This can be attributed to the rotor being in a locked state and/or an oscillatory state.

During the time period between t1 and t2, the power is switched off. That is, the rotor receives no power that causes it to move. Again, the time period between t1 and t2 is specified according to the specific application and needs. During this time period, a free-wheeling rotor would continue to rotate on its own due to momentum. It is clearly not the case here. There is no movement from the rotor as detected by the Hall sensor, both when rotor receives power and when the rotor receives no power. Thus, it is determined that the motor is locked and/or in the oscillatory state. And once it is determined that the rotor is not in the free-wheeling state, the power stays switched off to reduce the risk of causing damage to the driver circuit and/or the rotor. In an embodiment, a locked rotor routine is executed to turn the driving module off for a period of time (e.g., seven seconds), before the system restarts over again to determine if the rotor is still stuck.

It is to be appreciated that there are many scenarios that could lead to problems. For the scenario illustrated in FIG. 4, the conventional system described above might be capable of detecting a locked rotor condition. For example, the conventional system may determine that there is blockage since the rotor is not moving when power is supplied. However, as explained above, the conventional systems is often incapable of detecting oscillatory state when there are valid Hall signals when the rotor is powered. In contrast, embodiments of the present invention detect the oscillatory state and/or locked state both when there is no valid Hall signals when rotor is powered (as illustrated in FIG. 4), and when there is valid Hall signals when the rotor is not powered (illustrated in FIG. 5). It is to be noted that embodiments of the present invention are capable of detecting oscillatory state when conventional is not.

As shown in FIG. 5, the top waveform shows the Hall signal, which is based on the movement of the rotor as explained above. In alternative embodiments, other types of signals may be used to indicate rotor movements. The bottom waveform shows commutation signal that is used to cause the rotor to move.

The process of monitoring a rotor is divided into three time periods. Between the time period between t0 and t1, power is supplied to the rotor, which causes the rotor to move. For example, the power is supplied by a power driving circuit that is controlled by a processor and/or a microcontroller. In a specific embodiment, the time period between t0 and t1 is the time that is used to start up the rotor. For example, the time period is predetermined, which could be a few seconds. Depending on the specific application, the amount of the time between t0 and t1 varies.

During the time period between t0 and t1, the rising and falling edges of Hall signal indicates that are movements that correspond to output power. In another word, during the time period between t0 and t1, the rotor is moved when there is power. In a conventional system where the detection of oscillatory state is based on the rotor movement when there is power, the conventional system would conclude the rotor is working properly. In contrast, embodiments of the present invention do not stop here. Instead, the oscillatory state is determined during the time when there there the rotor is not power.

During the time period between t1 and t2, the power is switched off. That is, the rotor receives no power that causes it to move. Again, the time period between t1 and t2 is specified according to the specific application and needs. During this time period, a free-wheeling rotor would continue to rotate on its own due to momentum. It is clearly not the case here. There is no movement from the rotor as detected by the Hall sensor. Typically, whatever causes the rotor to be in the oscillatory state causes the rotor to stop moving when it is not powered. Thus, it is determined that the motor is locked and/or in the oscillatory state. And once it is determined that the rotor is not in the free-wheel state, the power stays switched off to reduce the risk of causing damage to the driver circuit and/or the rotor. In an embodiment, a locked rotor procedure is executed to turn the driving module off for a period of time (e.g., seven seconds), before the system restarts over again to determine if the rotor is still stuck.

Figure 6:
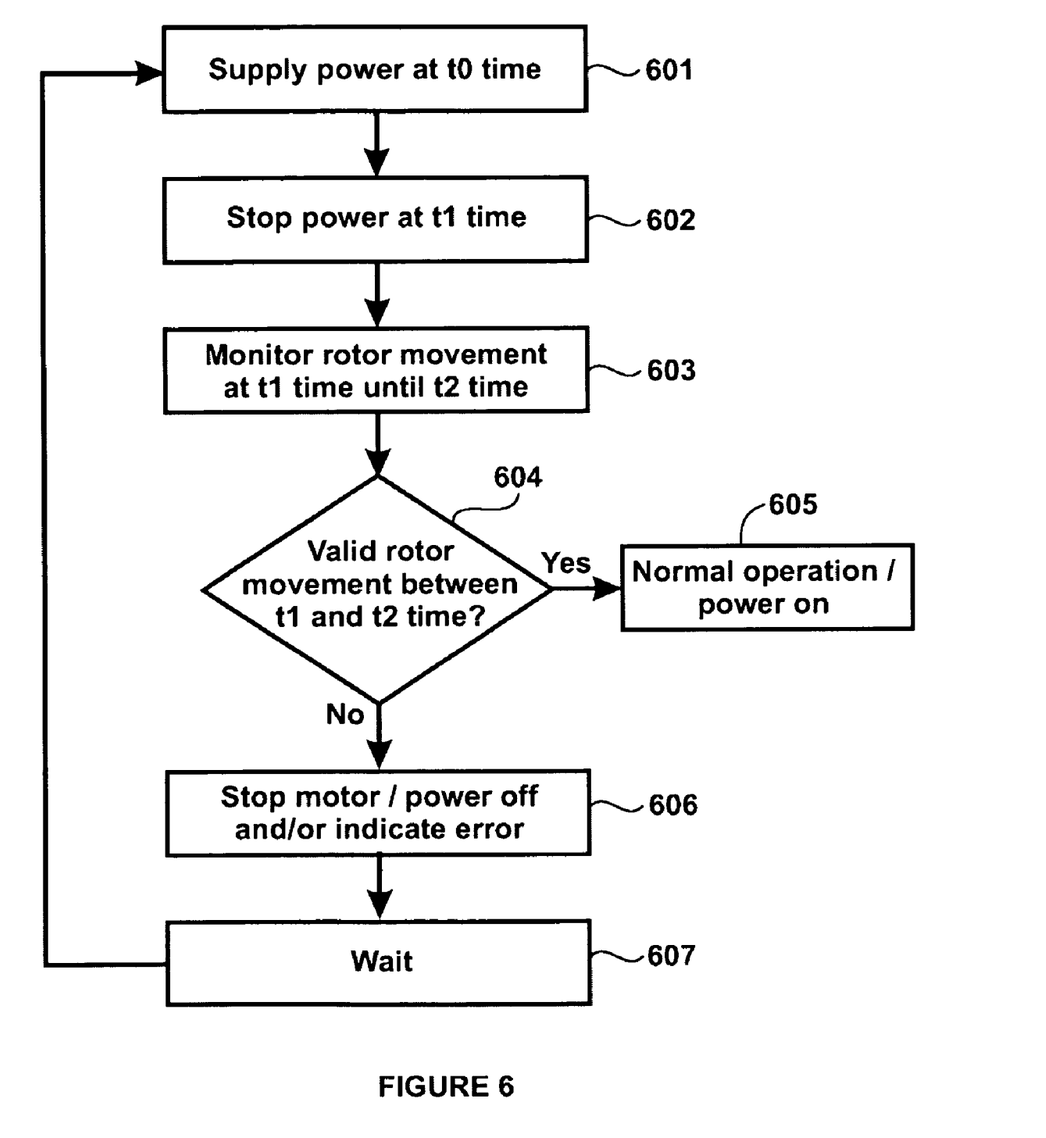
FIG. 6 is a simplified flowchart illustrating a process for detecting oscillatory state according to an embodiment of the present invention.

FIG. 6 is a simplified flowchart illustrating a process for detecting oscillatory state according to an embodiment of the present invention. This diagram is merely an example, which should not unduly limit the scope of the claims. One of ordinary skill in the art would recognize many variations, alternatives, and modifications. For example, various steps may be added, removed, replaced, rearranged, repeated, modified, and/or overlapped.

At step 601, power is supplied to the rotor at time t0, which is supposed to cause the rotor to move. For example, the power is provided by a driver module. In a specific embodiment, the time period between t0 and t1 is the time that is used to start up the rotor. For example, the time period is predetermined, which could be a few seconds. Depending on the specific application, the amount of the time between t0 and t1 varies. For example, step 601 corresponds to the time period between t0 and t1 in FIGS. 3-5. In various embodiments, step 601 is a part of the rotor start up procedure.

At step 602, the power is switched off at t1 time. For example, step 602 corresponds to the time period between t1 and t2 in FIGS. 3-5.

At step 603, the movement of the rotor is monitored at a time period between t1 and t2 time, during which the rotor receives no power. For example, step 603 corresponds to the time period between t1 and t2 in FIGS. 3-5. In a specific embodiment, the microcontroller includes a timer to keep track of various predetermined timer periods.

At step 604, whether the rotor is in an oscillatory state is determined. For example, step 604 corresponds to the time period between t1 and t2 time in FIGS. 3-5. During this time period, a free-wheeling rotor would continue to rotate on its own due to momentum. On the other hand, a rotor that is in an oscillatory state would come to a stop, even if there were any movement when the rotor was powered. Therefore, it is determined that if there is valid rotor movement between the t1 and t2 time, the rotor is free-wheeling and therefore should operate normally. On the other hand, if there is no valid movement at this time period, the rotor is likely to be in an oscillatory and/or locked state, and therefore should be stopped before any damaged is caused to the rotor and/or the control circuit.

At step 605, the rotor is powered and assumes normal operation. For example, step 605 corresponds to time after t2 in FIG. 3. In a specific embodiment, a signal for powering is sent to the driver module.

At step 606, the rotor is powered off. For example, step 605 corresponds to time after t2 in FIGS. 4 and 5. In addition to powering off the rotor, other steps may be performed. For example, a locking procedure may be executed to stop the rotor to make sure that the rotor is stopped. In addition, the system may send a signal to a user and/or operator to indicate that there might be a problem with the rotor.

In certain embodiments, step 607 is performed. The system waits for a predetermined period of time. For example, the predetermined period of time may be a few seconds to minutes and even hours. Among others, the predetermined period of time is to provide automatic system recovery and to prevent frequent power up process that could lead to system damages. After the predetermined period of time, the system restarts and goes back to step 601.

Figure 7:
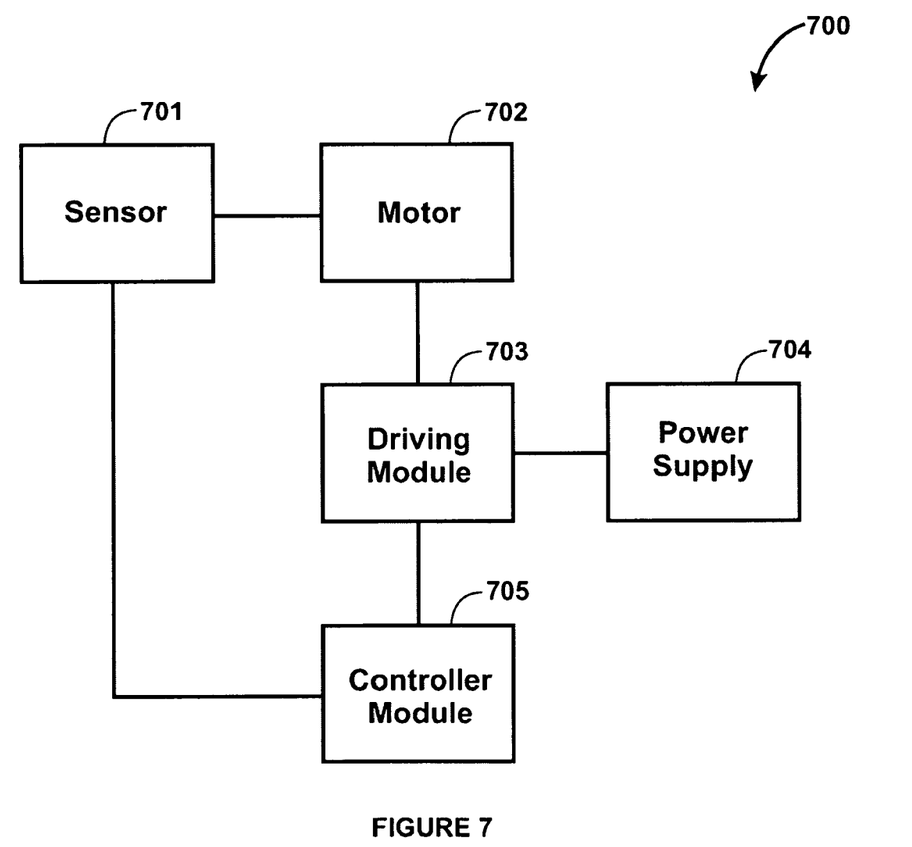
FIG. 7 is a simplified diagram illustrating an electric motor system according to an embodiment of the present invention.

FIG. 7 is a simplified diagram illustrating an electric motor system according to an embodiment of the present invention. This diagram is merely an example, which should not unduly limit the scope of the claims. One of ordinary skill in the art would recognize many variations, alternatives, and modifications. For example, the system 700 in FIG. 7 is adapted to perform the method illustrated in FIG. 6.

As shown in FIG. 7, the system 700 includes the following components:
1. a sensor 701;
2. a motor 702;
3. a driving module 703;
4. a power supply 704; and
5. a controller module 705.

The motor 702 is power and driven by the driving module 703. In a specific embodiment, the driving module 703 provides commutation signals to the motor 702 in response to the instructions received from the controller module. For example, the driving module 703 is power by a power supply 704. The motor 702 is monitored by the sensor 701. As discussed above, the sensor 701 may be a Hall sensor, an optical sensor, etc. The sensor 701 is connected to the controller module 705. The control module is adapted to determine whether the rotor is in an oscillation state based on the signal during the predetermined period of time (e.g., time period between t1 and t2 in FIGS. 3-5). The control module 705 determines that the rotor is in the oscillation state if the signal is less than a predetermined threshold level. In a specific embodiment, the control module 705 includes an internal timer that keeps track of various predetermined periods of time. The control module 705 is further configured to initiate a process for error handling if the rotor is in the oscillation state. For example, the control module instructs that driving module stops sending commutation signal to the motor if the rotor is in the oscillation state.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for controlling an electric motor, the method comprising:
    providing power to energize coils of the electric motor for a first time period;
    subsequent to providing the power, removing the power;
    subsequent to removing the power, monitoring a signal for a second time period, the signal being associated with rotation of a rotor of the motor;
    resume providing power to energize the coils when the signal indicates the rotor was rotating during the second time period, and
    performing an error process when the signal indicates the rotor was not rotating during the second time period.

2. The method of claim 1 wherein the error process comprises:
    providing power to the electric motor for a third time period after a predetermined time has elapsed;
    monitoring the signal for a fourth time period, the fourth time period being after the third time period; and
    determining whether the rotor was rotating or not based on the signal monitored during the fourth time period.

3. The method of claim 2 wherein the predetermined time period is at least 5 seconds.

4. The method of claim 1 wherein the error process comprises sending an error signal.

5. The method of claim 1 wherein the electric motor comprises a brushless DC motor.

6. The method of claim 1 further comprising:
    monitoring the signal for a third time period, the third time period being after the second time period;
    providing power to the electric motor when the signal indicates the rotor was not rotating during the second time period.

7. The method of claim 1 wherein the signal is an output of a Hall effect device.

8. The method of claim 7 the signals are characterized by rising and falling edges.

9. The method of claim 1 further comprising:
    monitoring the movements of the rotor using an optical motion detection module;
    generating the signal based on the movements of the rotor.

10. The method of claim 1 wherein the electric motor is in a power off mode during the second time period.

11. The method of claim 1 wherein the first time period is associated with a pre-drive stage.

12. The method of claim 1 wherein the second time period is associated with an actual driver stage.

13. The method of claim 12 wherein the actual driver stage is bipolar.

14. An electric motor system comprising:
    a rotor, the rotor including energize coils;
    a driving module, the driving module being adapted to provide a commutation signal to the energize coils;
    a sensor module, the sensor module being configured to output a signal; and
    a control module, the control module being adapted to:
        control the driving module to output the commutation signal for a first period of time;
        control the driving module to cease outputting the communication signal;
        monitor the signal output by the sensor module during a second period of time;
        control the driving module to output the commutation signal when the signal indicates the rotor was rotating during the second period of time; and
        perform an error process when the signal indicates the rotor was not rotating during the second period of time.

15. The system of claim 14 wherein the control module includes a timer.

16. The system of claim 14 wherein the sensor module comprises a Hall effect sensor.

17. The system of claim 14 wherein the sensor module comprises an optical sensor.

18. The system of claim 14 wherein the signal comprises Hall effect edges.

19. A method for controlling an electric motor, the method comprising:

providing power to the electric motor for a first time period, the power being used to cause a rotor of the electric motor to rotate;

subsequent to providing the power, removing the power;

subsequent to removing the power, monitoring a signal for a second time period, the signal being associated with movements of the rotor;

determining whether the rotor is in an oscillation state based on the signal, the rotor being in the oscillation state if the signal is less than a predetermined threshold level for the second time period;

if the rotor is in an oscillatory state:
generating a signal indicating the oscillatory state;
stopping providing power to the rotor for a third time period;
monitoring the signal for a fourth time period.

* * * * *